(12) United States Patent
Bowen

(10) Patent No.: US 11,880,475 B2
(45) Date of Patent: *Jan. 23, 2024

(54) SECURE FAST CHANNEL CHANGE

(71) Applicant: Synamedia Limited, Staines Upon Thames (GB)

(72) Inventor: Gareth John Bowen, Chandler's Ford (GB)

(73) Assignee: Synamedia Limited, Staines Upon Thames (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,549

(22) Filed: Oct. 24, 2022

(65) Prior Publication Data

US 2023/0042570 A1 Feb. 9, 2023

Related U.S. Application Data

(63) Continuation of application No. 16/831,551, filed on Mar. 26, 2020, now Pat. No. 11,520,915.

(51) Int. Cl.
| | |
|---|---|
| *G06F 21/62* | (2013.01) |
| *G06F 16/438* | (2019.01) |
| *G06F 21/31* | (2013.01) |
| *G06F 21/60* | (2013.01) |

(52) U.S. Cl.
CPC ...... *G06F 21/6209* (2013.01); *G06F 16/4387* (2019.01); *G06F 21/31* (2013.01); *G06F 21/602* (2013.01)

(58) Field of Classification Search
CPC .... G06F 21/602; G06F 21/31; G06F 21/6209; G06F 16/4387
See application file for complete search history.

(56) References Cited

U.S. PATENT DOCUMENTS

| | | |
|---|---|---|
| 4,995,080 A | 2/1991 | Bestler et al. |
| 2002/0172366 A1 | 11/2002 | Peterka et al. |
| 2004/0047470 A1 | 3/2004 | Candelore |
| 2005/0135622 A1 | 6/2005 | Fors et al. |
| 2006/0153381 A1 | 7/2006 | Kim et al. |
| 2007/0160208 A1* | 7/2007 | MacLean ............ H04N 21/435 380/239 |
| 2008/0123859 A1 | 5/2008 | Mamidwar |
| 2008/0155616 A1 | 6/2008 | Logan et al. |
| 2010/0195827 A1 | 8/2010 | Lee et al. |
| 2011/0246621 A1 | 10/2011 | May, Jr. et al. |

(Continued)

*Primary Examiner* — Vance M Little
(74) *Attorney, Agent, or Firm* — Fernando & Partners, LLP

(57) ABSTRACT

Techniques for secure fast channel change in live content streaming are described. In some embodiments, during content preparation, a packager and/or an encoder encrypts media content items at both the service level (e.g., by encrypting a first portion of the plurality of segments with a service level access key unique to a service) and the channel level (e.g., by encrypting a second portion of the plurality of segments with a channel level access key unique to a channel associated with the service). On the receiving end, a client device (e.g., a media player) requests a service level access key prior to content acquisition. As such, a client can join any channel on a segment protected with the service level key without waiting for a license for that channel first, and the channel license can be acquired in parallel with the content acquisition during channel switching.

20 Claims, 7 Drawing Sheets

(56) References Cited

U.S. PATENT DOCUMENTS

| | | |
|---|---|---|
| 2013/0042284 A1 | 2/2013 | Kandanala et al. |
| 2013/0129095 A1 | 5/2013 | Fahrny et al. |
| 2016/0198202 A1 | 7/2016 | Van Brandenburg et al. |
| 2017/0195715 A1* | 7/2017 | Innes ................. H04N 21/4331 |
| 2018/0063594 A1* | 3/2018 | Alexander ....... H04N 21/23439 |
| 2018/0181724 A1 | 6/2018 | Phirmis |
| 2018/0279002 A1 | 9/2018 | Cugi et al. |
| 2020/0104533 A1 | 4/2020 | Mick, Sr. et al. |
| 2020/0304849 A1* | 9/2020 | Hassler ................. H04N 21/84 |

* cited by examiner

SECURE FAST CHANNEL CHANGE

CROSS-REFERENCE TO RELATED APPLICATION

This application is a continuation of U.S. patent application Ser. No. 16/831,551, filed on Mar. 26, 2020, the contents of which are hereby incorporated by reference for all purposes.

TECHNICAL FIELD

The present disclosure relates generally to live streaming, and in particular, to secure fast channel change in live media content streaming.

BACKGROUND

Digital rights management (DRM) protects live media content delivered via adaptive bitrate (ABR) streaming. To that end, a media player often fetches a license (including a key) and the content itself independently. In particular, at the time a user joins a live stream, the player issues a request for a DRM license to decrypt the content. As such, decoding the media on the player may block upon the key being acquired and loaded into the player hardware.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
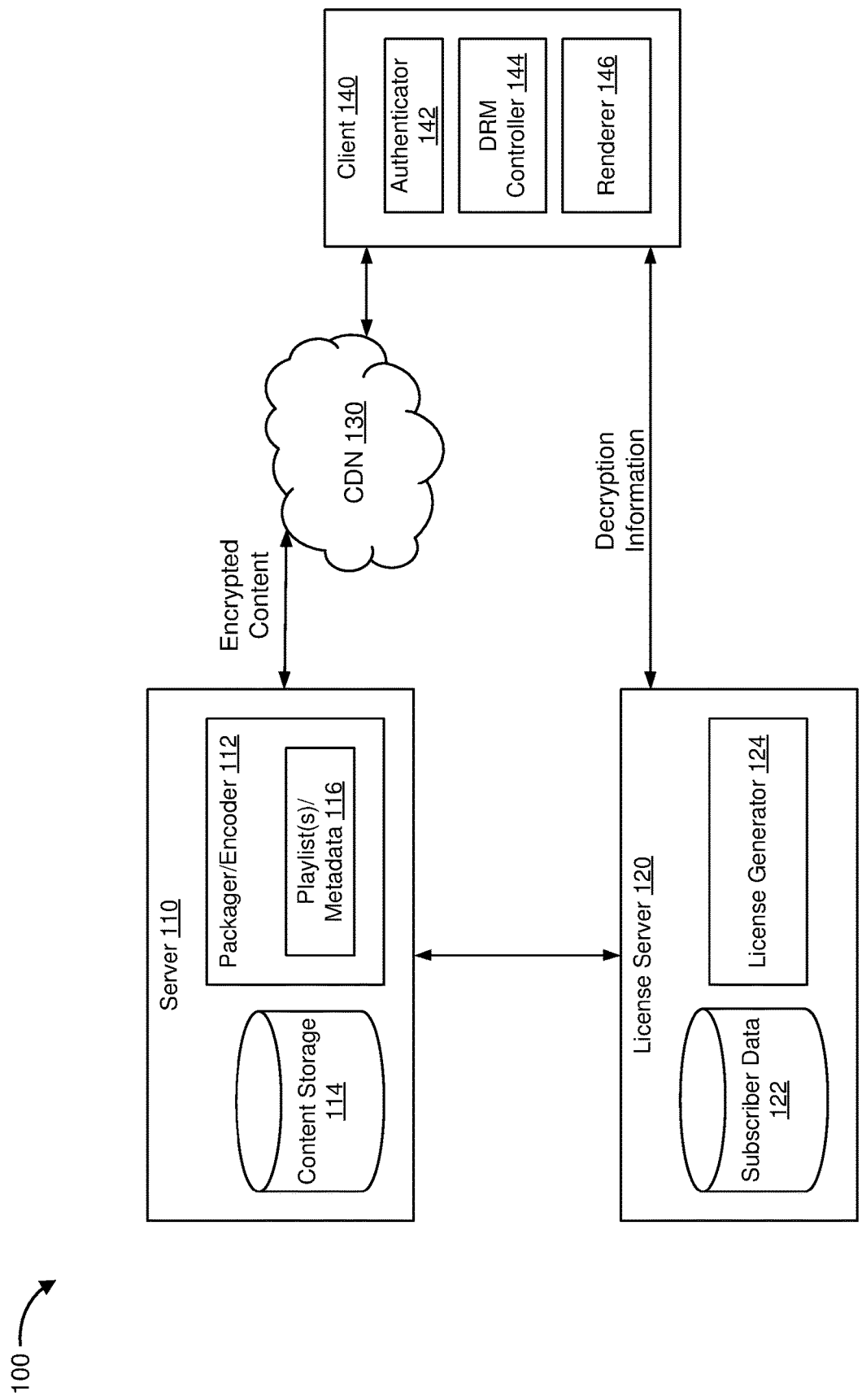
FIG. 1 is a block diagram of an example live content streaming system protected with digital rights management (DRM) in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for secure fast channel change are described herein. In accordance with some embodiments, during content preparation, a packager and/or an encoder encrypts media content items at both the service level (e.g., using a key generated from a service level access key generator) and the channel level (e.g., using a key generated from a channel level access key generator). On the receiving end, a client device (e.g., a media player) requests a service level access key prior to content acquisition. Accordingly, a client can join any channel on a segment protected with the service level key without waiting for a license for that channel first, and the channel license can be acquired in parallel with the content acquisition during channel switching. Because the channel license fetching does not incur delay and the media content is still being protected with DRM keys, the channel change methods and systems disclosed herein are both secure and fast.

In accordance with various embodiments, a method that is performed on the server side includes encrypting a plurality of segments of a media content item, according to a segment encryption pattern, by encrypting a first portion of the plurality of segments with a service level access key unique to a service and encrypting a second portion of the plurality of segments with a channel level access key unique to a channel associated with the service. The method further includes providing the service level access key in accordance with successful authorization of user access to the service. The method additionally includes providing the channel level access key in response to a request for the channel and in accordance with a determination of entitlement to the channel.

In accordance with various embodiments, a method that is performed at a client device includes obtaining a service level access key in accordance with successful authorization of access to a service. The method further includes requesting a plurality of segments of a media content item associated with a channel of the service and in parallel requesting a channel level access key to the channel. The method also includes decrypting a first segment of the plurality of segments using the service level access key upon receiving the first segment. The method additionally includes decrypting a second segment of the plurality of segments with the channel level access key upon successful request of the channel level access key.

Example Embodiments

As explained above, service providers often utilize digital rights management (DRM) to protect live content delivered via adaptive bitrate (ABR) streaming. In order to render the live content protected with a DRM license, a media player typically fetches the DRM license (including a key) and the content itself independently. While some degree of parallelism may be achieved, e.g., by starting the download of content independently, previously existing live content delivery solutions are inadequate in providing secure fast channel change.

In particular, time-to-first-video is an important key performance indicator (KPI) in measuring streaming performance. In live over-the-top (OTT) media services, time-to-first-video effectively governs channel change speed. Typically, building a buffer to defend against network problems takes up the largest proportion of channel change delay, and most other things (e.g., decryption, demultiplexing, decoding, and/or rendering, etc.) can happen in parallel. However, while a buffer is built, the availability of decryption keys may block decryption, demultiplexing, decoding, and/or rendering, etc. For some previously existing solutions that localize encrypted live content with a personal key as early as possible (e.g., upstream of an actual video player), the serialized delay compounds the problem. Accordingly, the acquisition of the license (including the key(s)) for live media content decryption is an important contributor in channel change delay in live streaming.

For video on demand (VOD) content, one mechanism for allowing content playback to happen independently of DRM is to leave the first few segments of the asset in the clear. Such a solution does not work for live content, since it is impossible to know where and when a client would join the live stream. Some solutions for live content use root and leaf keys for live content protection. However, such solutions make the root a weak point from a security point of view, e.g., as loss of the root key effectively opens up all channels that it protects. Other DRM solutions for live content include using multiple keys in a single license. In such solutions, the size of the license is limited. In other words, the channel change performance is limited to the channels referenced from within the single license. Consequently, the number of channels managed under a single license is limited.

The secure fast channel change methods and systems described herein address the aforementioned performance and security issues in live content streaming. The secure fast channel change solution described herein can achieve VOD-like license management (e.g., in parallel with playback having started) while ensuring that the live content is securely protected.

Reference is now made to FIG. 1, which is a block diagram of an exemplary live content delivery system 100 in accordance with some embodiments. While some of the embodiments describes the live content delivery techniques with reference to adaptive bitrate (ABR) protocol, other suitable live content delivery protocol may be used for implementing the subject matter. In some embodiments, the content delivery system 100 includes a server 110 (e.g., including one or more servers), a license server 120, a content delivery network (CDN) 130 and a client device 140. Although a single license server 120, a single CDN 130, and a single client device 140 are illustrated in FIG. 1, the system 100 may include one or more license servers 120 as well as one or more client devices 140, and may include zero, one, or more CDNs 130. For instance, the CDN(s) 130 may be included in the system 100 in order to provide higher scalability. As such, the server 110 (e.g., a headend) provides live media content to the client device(s) 140, optionally via the CDN(s) 130. For the sake of simplicity, the subject matter will be described hereinafter for the most part with reference to a single license server 120, a single client device 140, and sometimes a single CDN 130.

In some embodiments, the server 110 is an over-the-top (OTT) video system, which provides just in time digital rights management (DRM) encryption. Additionally or alternatively, in some embodiments, the server 110 is operated by any entity that encrypts the live media content, such as a vendor of the CDN 130, a streaming company, etc. As shown in FIG. 1, in some embodiments, the server 110 includes one or more packagers/encoders 112 and one or more content storages 114. Further as shown in FIG. 1, in some embodiments, the license server 120 includes one or more storages for subscriber data 122 (e.g., keys and/or entitlements, etc.) and one or more license generators 124. In accordance with the ABR protocol, the packager/encoder 112 typically encodes a media content item to a single stream configured for a single output bitrate or to multiple streams configured for a range of output bitrates. The packager/encoder 112 also generates playlist(s) and/or metadata 116 for the media content item.

As used herein, references herein to the packager/encoder 112 (or the content storage 114) in the single form cover embodiments where there is a single packager/encoder 112 (or the content storage 114) as well as embodiments where there is a plurality of packagers/encoders 112 (or a plurality of content storages 114). Likewise, as used herein, references herein to the storage for subscriber data 122 (or the license generator 124) in the single form cover embodiments where there is a single storage for subscriber data 122 (or the license generator 124) and embodiments where there is a plurality of storages for subscriber data 122 (or a plurality of license generators 124).

Further, although FIG. 1 illustrates the license server 120 being a separate server from the server 110, the servers 110 and 120 can be configured to collocate on one location and/or computing device or distributed over multiple locations and/or computing devices. Additionally, although FIG. 1 illustrates the playlist(s) and/or metadata 116 generated by the packager/encoder 112 as being stored separately from the content storage 114, in some embodiments, the playlist(s) and/or metadata 116 are stored in the content storage 114 along with the clear segments (also referred to as unencrypted, or raw media content item).

In some embodiments, a media content item (also referred to as "a content item") stored in the content storage 114 includes any suitable data, for example, visual data, audio data, and/or metadata, etc. In some embodiments, the content item, which can be live or from a pre-recorded source is stored in clear in the content storage 114, thus allowing the content item to potentially be reused in different formats (e.g., different encoding formats for OTT content) and to be packaged dynamically by the packager/encoder 112. In some embodiments, the content item can be encoded as MPEG-2, MPEG-4, MP3, AC-3, and/or any other suitable format.

To facilitate the content delivery in various formats, in some embodiments, the packager/encoder 112 generates an ABR master playlist (also referred to as "a main playlist") and ABR media playlist(s) for the content item. In some embodiments, both the ABR master playlist and the ABR media playlist(s) are stored in the playlist(s)/metadata 116. The ABR master playlist references ABR media playlist(s) that include respective listing(s) of segments, which when played sequentially, would play the content item. Additionally or alternatively, in some embodiments, the packager/encoder 112 does not generate an ABR master playlist for the content item, but instead generates ABR media playlist(s) for the content item. In such embodiments, the ABR media playlist(s) (e.g., stored in the playlist(s)/metadata 116) includes respective list(s) of segments which when played sequentially will play the content item.

It should be noted that the term "ABR" as used herein with reference to an ABR master playlist or to an ABR media playlist refers to a playlist generated in accordance with an ABR protocol, regardless of whether the content item is encoded at a single bitrate and a single ABR media playlist is generated, or the content item is encoded at multiple bitrates and a plurality of ABR media playlists are generated. Each generated ABR media playlist for a content item describes a particular version (i.e. a particular stream) of the content item, specifying the content item encoded at a particular bitrate, in a particular format, and at a particular resolution (if containing video).

As used herein, the terms "segment", "fragment", and "chunk" are used interchangeably. Accordingly, those skilled in the art will appreciate that the terms "segment", "fragment", and "chunk", in all of their various forms, are understood herein to be referring to the same thing, unless otherwise explicitly noted. Also as used herein, the terms "playlist", "index file", "manifest", "metadata" are used interchangeably. Accordingly, the terms "playlist", "index file", "manifest", and "metadata" in all of their various forms, are understood herein to be referring to the same thing, unless otherwise explicitly noted.

An exemplary ABR media playlist, in its basic form (e.g., in a Moving Picture Experts Group Audio Layer 3 Uniform Resource Locator (MP3 URL or M3U) file, 8-bit Unicode Transformation Format (UTF-8) text file, etc.), typically comprises heading information followed by tags. For example, for an HTTP live streaming (HLS) media playlist, tags may include EXTINF as follows:

EXTINF: 10.0,
http://Chan1/stream1/seg2.ts
EXTINF:10.0,
http://Chan1/stream1/seg3.ts Each EXTINF is a record marker that describes the segment identified by the Uniform Resource Identifier (URI) that follows it. The format of the URI may vary depending on the embodiment, and the format shown above is but one example of a format. The EXT INF tag includes a "duration" attribute (e.g., that is an integer or floating-point number in decimal positional notation) that specifies the duration of the segment, e.g., in seconds. In the above example, the duration of each of the segment 2 and segment 3 is 10.0 seconds.

In some embodiments, the packager/encoder 112 inserts a key tag in an ABR media playlist which allow a client device 140 to look up decryption information (e.g., decryption key and/or initialization vector (IV), etc.) for a segment. In some embodiments, the packager/encoder 112 encrypts the segment when the segment is requested by the client device 140 or the CDN 130. During the encryption, the packager/encoder 112 inserts in the ABR media playlist a segment URI generated based on encryption metadata. The encryption metadata is indicative of the encryption information (e.g., encryption key and/or IV, etc.) that matches the decryption information indicated by the key tag. The ABR media playlist is then sent to the client device 140 or the CDN 130. In some embodiments, the inserted key tag that is associated with the segment identifies a particular DRM license.

On the client side, the client device 140 receives the playlist, which includes the key tag for looking up the decryption information. In some embodiments, the client device 140 includes an authenticator 142 to authenticate the identity of a user, e.g., whether the user has subscribed to a service in order to login to an application. In some embodiments, in response to successful authentication of the user, the client device 140 obtains a key identifier included in the key tag. In some embodiments, the client device 140 further includes a DRM controller 144 that sends the key identifier to the license generator 124. In response, the license generator 124 uses the key identifier to fetch decryption information (e.g., the decryption key and/or IV, etc.) for the segment from the subscriber data storage 122. The license generator 124 then provides the decryption information to the client device 140.

In order to receive the encrypted content, the client device 140, or the CDN 130 on behalf of the client device 140, requests the segment, including sending a URI for the segment (e.g., the URI listed in the ABR media playlist for the segment) to the server 110. The server 110 determines the encryption metadata based on the URI, and uses the encryption metadata to obtain the encryption information for the segment. The server 110 then encrypts the segment according to the encryption information. The segment, while encrypted, is sent by the server 110 to the CDN 130 or to the client device 140. Upon receiving the encrypted segment, the client device 140 obtains the decryption information from the license generator 124 to decrypt the segment. The decrypted media content can then be passed to a renderer 146 for display.

In some embodiments, the system 100 includes more, less, and/or different elements than shown in FIG. 1. Each of the elements of system 100 includes appropriate hardware, software, and/or firmware to perform the operations attributed to the element herein. Some examples of appropriate hardware, software, and/or firmware for certain elements will be provided further below. Operation(s) attributed to an element of system 100 herein should not be considered binding and in some embodiments, other element(s) in the system 100 may additionally or alternatively perform such operation(s).

Figure 2:
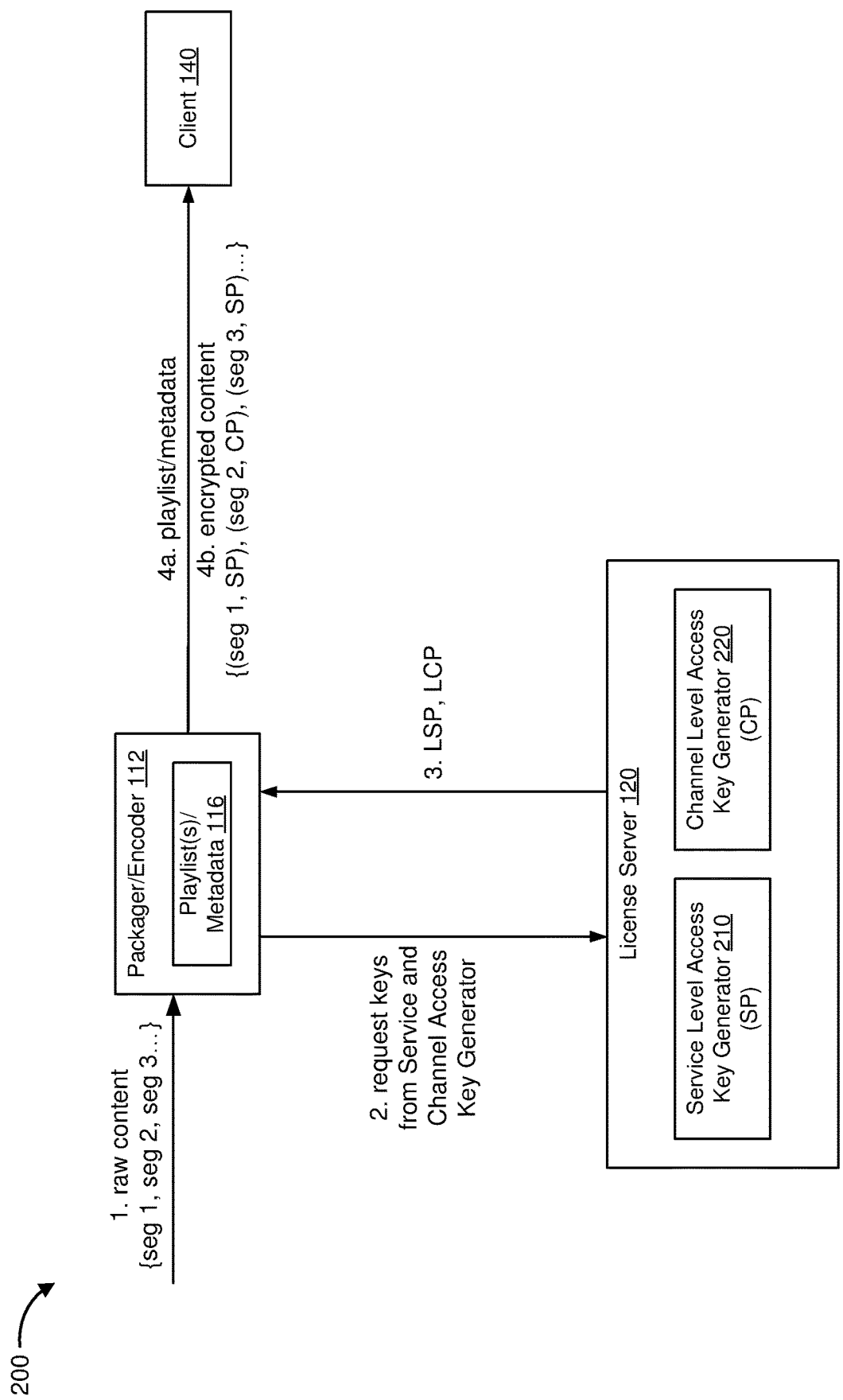
FIG. 2 is a block diagram of an example content preparation pipeline for secure fast channel change in accordance with some embodiments.

FIG. 2 is a block diagram 200 illustrating a content preparation pipeline for secure fast channel change in accordance with some embodiments. The license server 120 shown in FIG. 1 typically produces a key every few hours from a given content identifier (e.g., a channel ID) using a unique seed representing the property of a service provider. In this way, the protection of a channel is tied directly to the service provider. In accordance with some embodiments, as shown in FIG. 2, the license server 120 includes two key generators, namely a service level access key generator 210 and a channel level access key generator 220. In some embodiments, the service level access key generator 210 and the channel level access key generator 220 are configured with different seeds, denoted as SP seed and CP seed, and both are unique to a service provider.

In the content preparation pipeline, the packager/encoder 112 first obtains a raw media content item in step 1, e.g., obtaining {segment 1, segment 2, segment 3, ... } associated with the raw media content item from the content storage 114 (FIG. 1). The packager/encoder 112, in step 2, is configured to request keys from both the service level access key generator 210 and the channel level access key generator 220 in accordance with some embodiments.

In some embodiments, the first seed SP is used by the service level access key generator 210 to generate service level access keys that are shared between channels to provide service level access. For example, once a user has signed up for a service from a service provider, a license is issued, which includes a service level access key for the service. In some embodiments, the service level access key is shared between channels that come with the service. A single service level access key can be shared among all channels provided by a service provider or a subset of channels provided by the service provider in accordance with some embodiments. For example, channels can be grouped into logical partitions, e.g., sports, movies, etc., and the channels within each partition share the same service level access key. In some embodiments, a content identifier maps to the partition of channels, and the service level access key is wrapped in a license for the group of channels, denoted as LSP.

In some embodiments, the second seed CP is used by the channel level access key generator 220 to generate channel level access keys specific to each channel to provide channel level access. For example, once a user has made payment to view a channel, a license is issued to indicate the entitlement of the user to the channel. The license can include a channel level access key for the channel. In some embodiments, a channel level access key per channel is wrapped in a license, denoted as LCP.

In some embodiments, for enhanced security, both the SP and the CP seeds rotate or update periodically. Further, in some embodiments, the rotation and/or update rates differ for the SP and the CP seeds. For example, the SP seed may rotate and/or update daily; while the CP seed may rotate and/or update every 4 hours.

Upon obtaining the LSP and LCP in step 3, in some embodiments, the packager/encoder 112 encrypts each successive segment on the presentation timeline with a different seed, e.g., 50% of segments are protected with the SP seed and the other 50% are protected with the CP seed as shown in FIG. 2. As will be described below with reference to FIGS. 4A-4C, the server can encrypt the segments according to other segment encryption patterns in accordance with various embodiments.

In addition to encrypting the content, the packager/encoder 112 sets key IDs in the content (directly or indirectly providing markup in the content) indicating which seed is used to protect a particular segment. In some embodiments, each segment includes a key ID (e.g., an identifier that specifies how to obtain the key). In cases where the segment does not include the key ID, in accordance with some embodiments, the packager/encoder 112 specifies relevant tags in the playlist before one or more segments indicating which seed is used to protect the one or more segments. In some embodiments, for HLS content, the EXT-X-KEY tag can be updated with an attribute START=true to indicate that the following segment is protected with the SP seed. Alternatively and/or in conjunction with using the EXT-X-KEY tag, as will be described below with reference to FIG. 3, for HLS content, the packager/encoder 112 may include an EXT-X-START attribute to define a start position that coincides with a segment protected with the SP seed. The encrypted content, e.g., {(segment 1, SP), (segment 2, CP), (segment 3, SP), . . . }, and the playlist(s) and/or metadata indicating the key IDs are then sent to the client device 140 in steps 4a and 4b.

Figure 3:
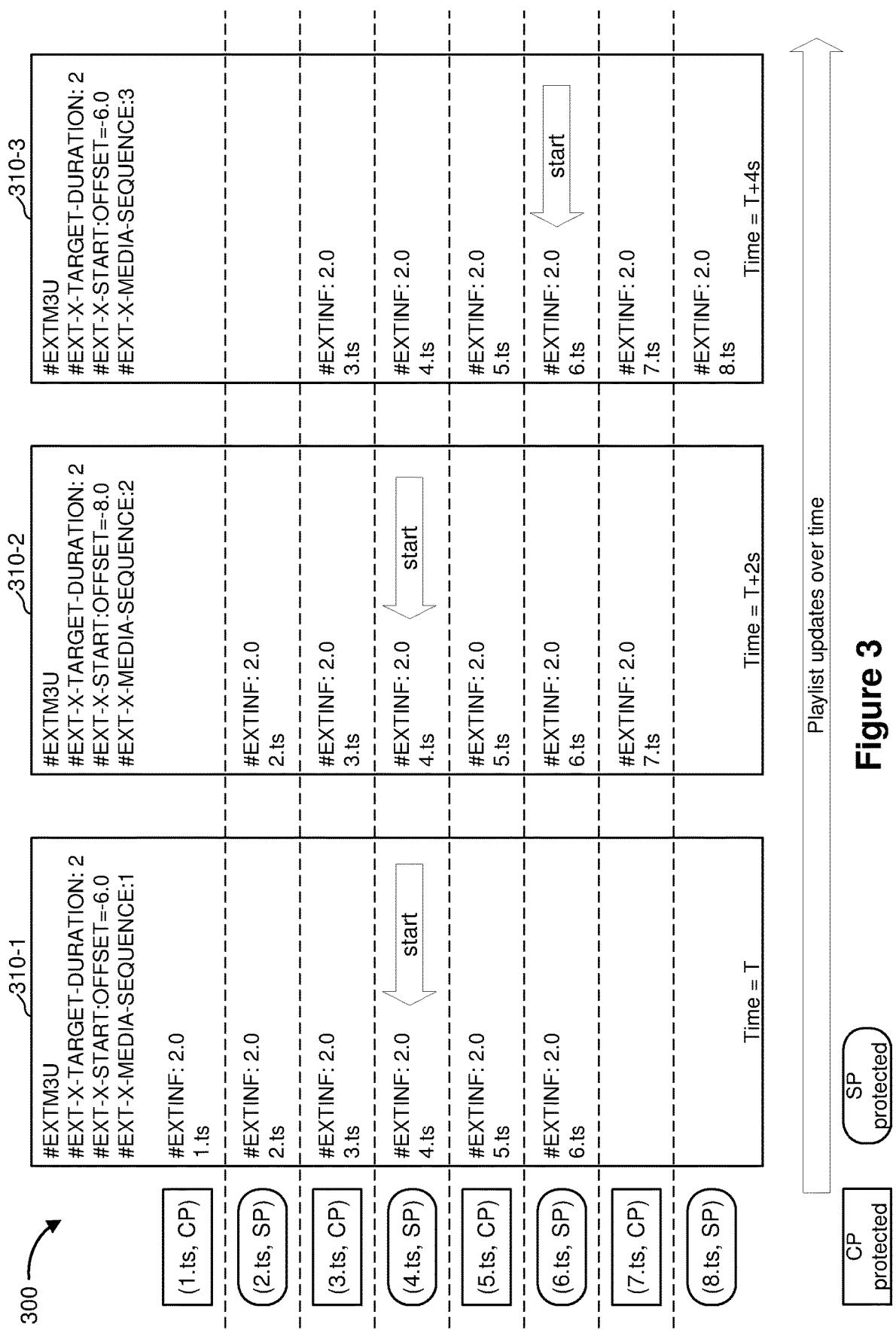
FIG. 3 is a diagram illustrating example playlist updates over time for secure fast channel change in accordance with some embodiments.

FIG. 3 illustrates updates 300 to exemplary playlists 310-1, 310-2, and 310-3 in sequence in accordance with some embodiments. The exemplary playlists 310-1, 310-2, and 310-3 specify, e.g., with the EXT-X-TARGET-DURATION tag, that the duration of each segment is 2 seconds. It should be noted that tags shown in FIG. 3 are illustrative and not exhaustive and that one or more tags are omitted from FIG. 3 for clarity. For example, the EXT-X-KEY tag has been omitted to highlight the control of the playback start position. As shown in FIG. 3, each successive segment on the presentation timeline is encrypted with a different seed, e.g., 1.ts, 3.ts, 5.ts, and 7.ts are segments protected with the CP seed and 2.ts, 4.ts, 6.ts, and 8.ts are segments protected with the SP seed, etc.

In order to guide the client device, at time T, the first playlist 310-1 in sequence (as indicated by the tag EXT-X-MEDIA-SEQUENCE with attribute 1) specifies in the EXT-X-START tag an OFFSET value of −6.0. As is known in the art, when the OFFSET value is negative, the time specified indicates the starting point from the end of the playlist 310. As such, according to the EXT-X-START attribute, the client device is guided to a starting position pointing at 4.ts, which is a segment protected with the SP seed.

When a new segment is added to the presentation, the EXT-X-START attribute is adjusted, so that the client device 140 can play from a segment protected with the SP seed. For example, at time T+2 seconds, a new segment 7.ts is added to the presentation. The EXT-X-START tag in the second playlist 310-2 in sequence is adjusted with an OFFSET value of −8.0. As such, according to the EXT-X-START attribute, the client device is guided to a starting position pointing at 4.ts, which is protected with the SP seed. In another example, at time T+4 seconds, a new segment 8.ts is added to the presentation. The EXT-X-START tag in the third playlist 310-3 in sequence is adjusted with an OFFSET value of −6.0. As such, according to the EXT-X-START attribute, the client device is guided to a starting position pointing at 6.ts, which is a segment protected with the SP seed.

Because the client device is guided to a starting position protected with the SP seed, compared to a regular stream played using previously existing systems and methods, users may sometimes find themselves tuning one or more segments duration behind live as a result. For example, in a previously existing live streaming system, the live content associated with the playlist shown in FIG. 3 may start to play 3.ts at time T, which is protected with the CP seed. In the secure fast channel change system disclosed herein, the client device is guided to play 4.ts at time T, which is protected with the SP seed and one segment behind 3.ts. However, given the nature of the delivery mechanism, this discrepancy (e.g., 2 seconds duration) is unlikely to be visible to the majority of users. As segment durations are tending to be shorter, the impact from tuning into a segment behind live will be even less.

It should be noted that while some of the embodiments described herein reference tags in accordance with the HLS protocol, tags in accordance with any other suitable ABR protocols (e.g., Dynamic Adaptive Streaming over HTTP (DASH)) may be used in place of and/or in conjunction with the HLS protocol tags. As such, the secure fast channel change system described herein can be implemented pursuant to other suitable ABR protocols.

Figure 4:
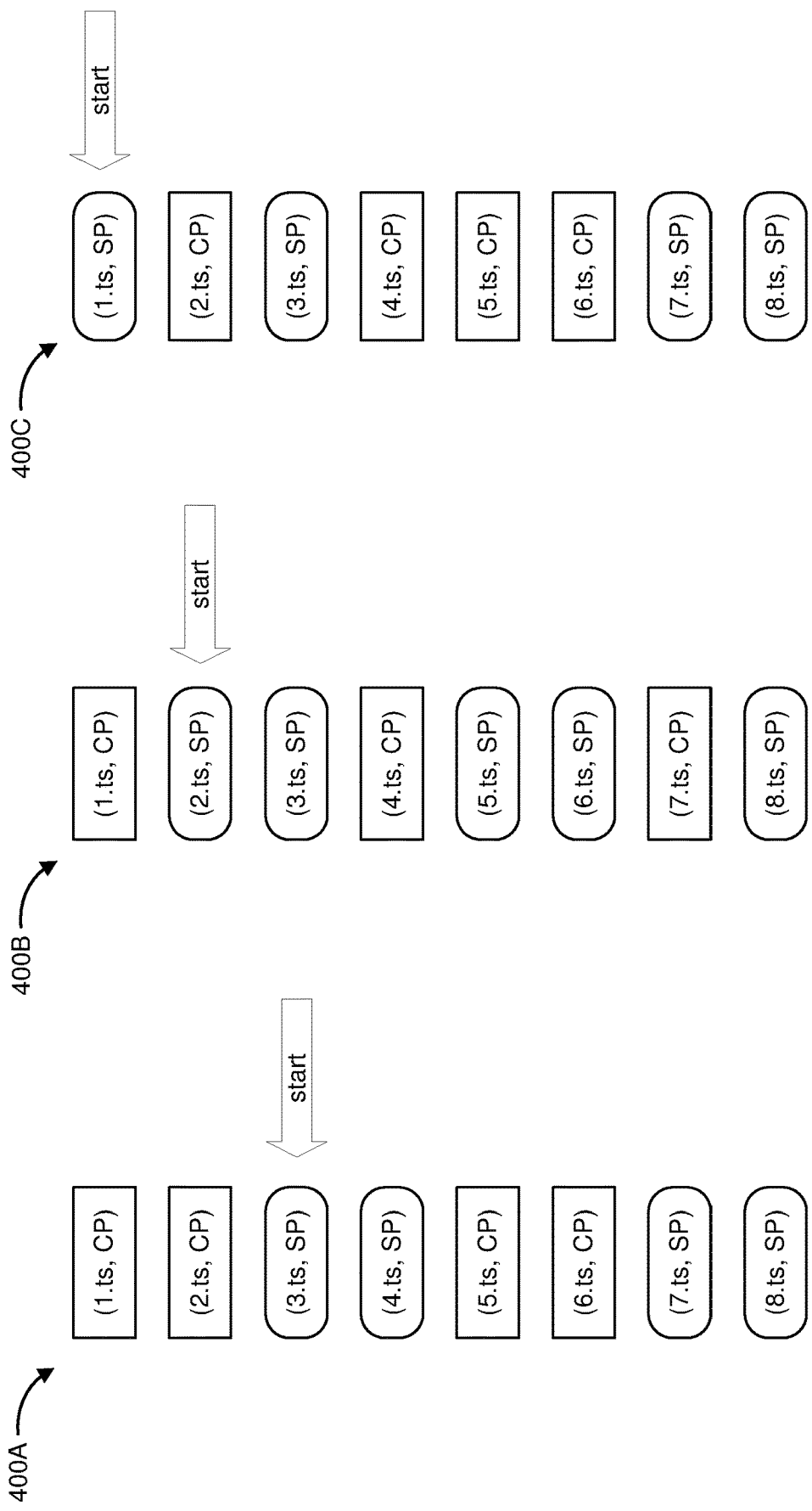
FIGS. 4A-4C are diagrams illustrating various segment encryption patterns for secure fast channel change in accordance with some embodiments.

FIGS. 4A-4C illustrate exemplary segment encryption patterns 400A-400C for secure fast channel change in accordance with some embodiments. In FIG. 4A, according to a ratio of 50% protected with the SP seed and 50% protected with the CP seed, the packager/encoder 112 (FIG. 1) encrypts two segments with the CP seed and encrypts two successive segments with the SP seed, e.g., 1.ts, 2.ts, 5.ts, and 6.ts are segments protected with the CP seed and 3.ts, 4.ts, 7.ts, and 8.ts are segments protected with the SP seed. In such embodiments, the packager/encoder 112 directs the client device 140 (FIGS. 1 and 2) to a starting position pointing to a segment protected with the SP seed, e.g., at 3.ts.

The segment encryption pattern shown in FIG. 4A is different from the encryption patterns shown in FIGS. 2 and 3. In FIGS. 2 and 3, the segment encryption patterns include encrypting one segment with the SP seed and alternating the encryption of the segment backward and forward with the CP seed. Further in such embodiments, as shown in FIG. 3, when a new segment is added to the presentation, the starting position is adjusted by a segment duration, either forward or backward, so that the client is guided to a segment protected with the SP seed.

In comparison, in FIG. 4A, the alternating segment encryption pattern includes two consecutive segments encrypted with the SP seed and two neighboring consecutive segments encrypted with the CP seed. Further, according to the segment encryption pattern 400A, when a new segment is added to the presentation, the starting position may be adjusted by more than a segment duration, e.g., by two segments duration, either forward or backward, so that the client is guided to a segment protected with SP seed. Both the segment encryption patterns shown in FIGS. 2 and 3 and the segment encryption pattern 400A are effective in protecting the media content, since the loss of the SP seed does not open up every channel 100% of the time and viewing every other segment(s) is not a desirable viewing experience.

The alternating segment encryption pattern is not limited to the ratio of 1:1 or 2:2. In some embodiments, as shown in FIG. 4B, according to a pattern of ⅓ of the segments protected with the CP seed and ⅔ protected with the SP seed, the packager/encoder 112 encrypts one segment with the CP seed and encrypts two successive segments with the SP seed. In such embodiments, the packager/encoder 112 directs the client device 140 to a starting position pointing to a segment protected with the SP seed, e.g., at 2.ts. In such embodiments, the client device would have more time to download the CP seed for viewing the segments protected with the CP seed.

In some embodiments, the segment encryption pattern is configurable, such that the number of segments protected with the SP seed and the number of segments protected with the CP seed vary over time, e.g., varying patterns at different portions of the media stream. As shown in FIG. 4C, the packager/encoder 112 encrypts a first portion of the media stream (e.g., 1.ts) with the SP seed and encrypts a second portion of the media stream (e.g., 2.ts) with the CP seed. The packager/encoder 112 then encrypts a third portion of the media stream (e.g., 3.ts) with the SP seed and encrypts a fourth portion of the media stream (e.g., 4.ts, 5.ts, and 6.ts) with the CP seed before encrypting a fifth portion (e.g., 7.ts and 8.ts) with the SP seed again. Therefore, various portions of the media stream have various segment encryption patterns. In such embodiments, the packager/encoder 112 still directs the client device 140 to a starting position pointing to a segment protected with the SP seed for secure fast channel change, e.g., at 1.ts.

Figure 5:
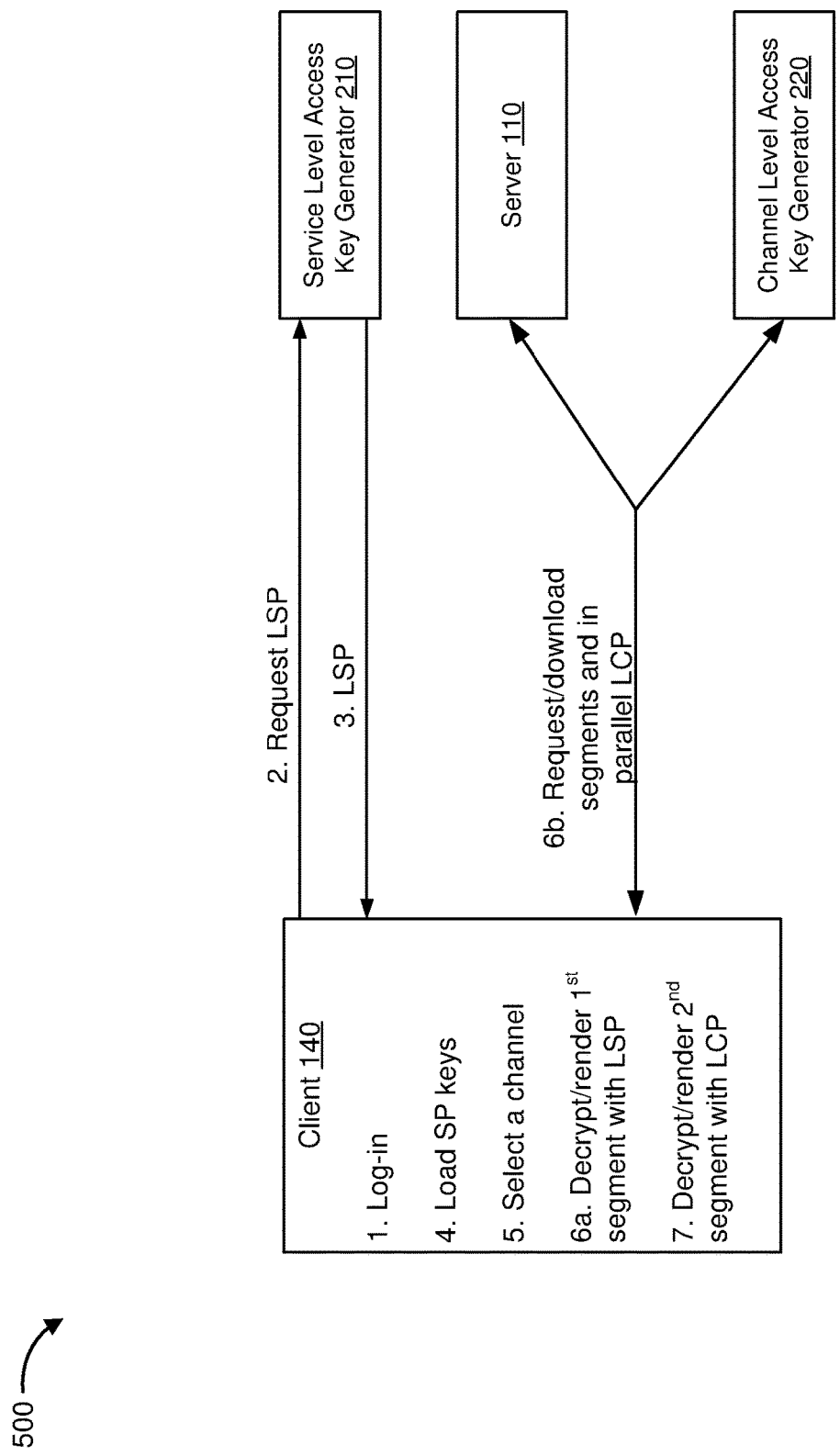
FIG. 5 is a block diagram illustrating secure fast channel change from a client perspective in accordance with some embodiments.

FIG. 5 is a block diagram 500 illustrating secure fast channel change from a client perspective in accordance with some embodiments. On the client device 140, as represented by step 1, the client device 140 facilitates the authentication and/or authorization of the user, e.g., user login through an application on the client device 140. Once the user is authorized to access a service (e.g., verified the payment of subscribing to a service package), as represented by step 2, the client device 140 requests an LSP from the service level access key generator 210 without user intervention. In other words, even without or before the client device 140 tuning into any channel, the client device 140 obtains the SP keys (as represented by step 3) from the service level access key generator and loads the SP keys (as represented by step 4) as soon as the user is logged into the service.

At the point that the user selects a channel, as represented by step 5, the SP keys are loaded. In step 6a, in response to the channel selection, the client device 140 requests and obtains the first segment from the server 110; and in parallel, the client device 140 requests and obtains an LCP from the channel level access key generator 220. In some embodiments, as represented by step 6b, while the client device 140 requesting and downloading the LCP from the channel level access key generator 220, once the first segment is downloaded, the client device 140 can immediately decrypt it using one of the SP keys for fast channel change. In some embodiments, the requested CP seeds are loaded before decryption of the second segment starts. As a result, the secure fast channel change methods described herein do not incur delays from fetching the keys for decryption.

In some embodiments, to further enhance the user experience, the client device 140 displays previews and/or thumbnails in an electronic program guide (EPG) for navigating between channels. In some embodiments, in response to a user highlighting a channel in the EPG, the client device 140 can utilize the service level access key to decode the first frame from the most recent SP seed protected segment. The rendering of the first frame gives the user an impression of tuning to the active channel during channel selection.

The secure fast channel change methods and systems disclosed herein are both efficient and secure. From a performance perspective, decoupling license acquisition from channel change permutation improves efficiency. In particular, independently of channel change (e.g., out-of-band), client devices proactively fetch licenses that include the service level keys. As such, a client device can join any channel on a segment protected with the service level access key without first performing a license request for that channel. Further, the channel level access key itself can be acquired in parallel with the media content item acquisition. Providing the segment duration is sufficiently large enough to acquire the channel level access key and load the channel level access key, no delay will be incurred by fetching the channel license. Accordingly, relative to previously existing live content delivery methods and systems, the secure fast channel change methods and systems disclosed herein shorten KPIs such as time-to-first-video and improve streaming performance.

Further, from a security perspective, providing an LSP to users authorized to a service ensures that the overall service is protected, and providing an LCP to users entitled to a channel ensures that the channel is protected. In some embodiments, the users are not allowed to select channels to which they are not entitled. Although a user, who has the LSP, may "trick" a player to start playback (e.g., by using the LSP to decrypt a first segment), if they do not have entitlements to acquire an LCP, it is impossible to decrypt subsequent segments using LCP, thus playback fails. Accordingly, the secure fast channel change methods and systems disclosed herein apply authorization on every segment and make enforcement possible on at least every other segment in accordance with some embodiments.

Figure 6:
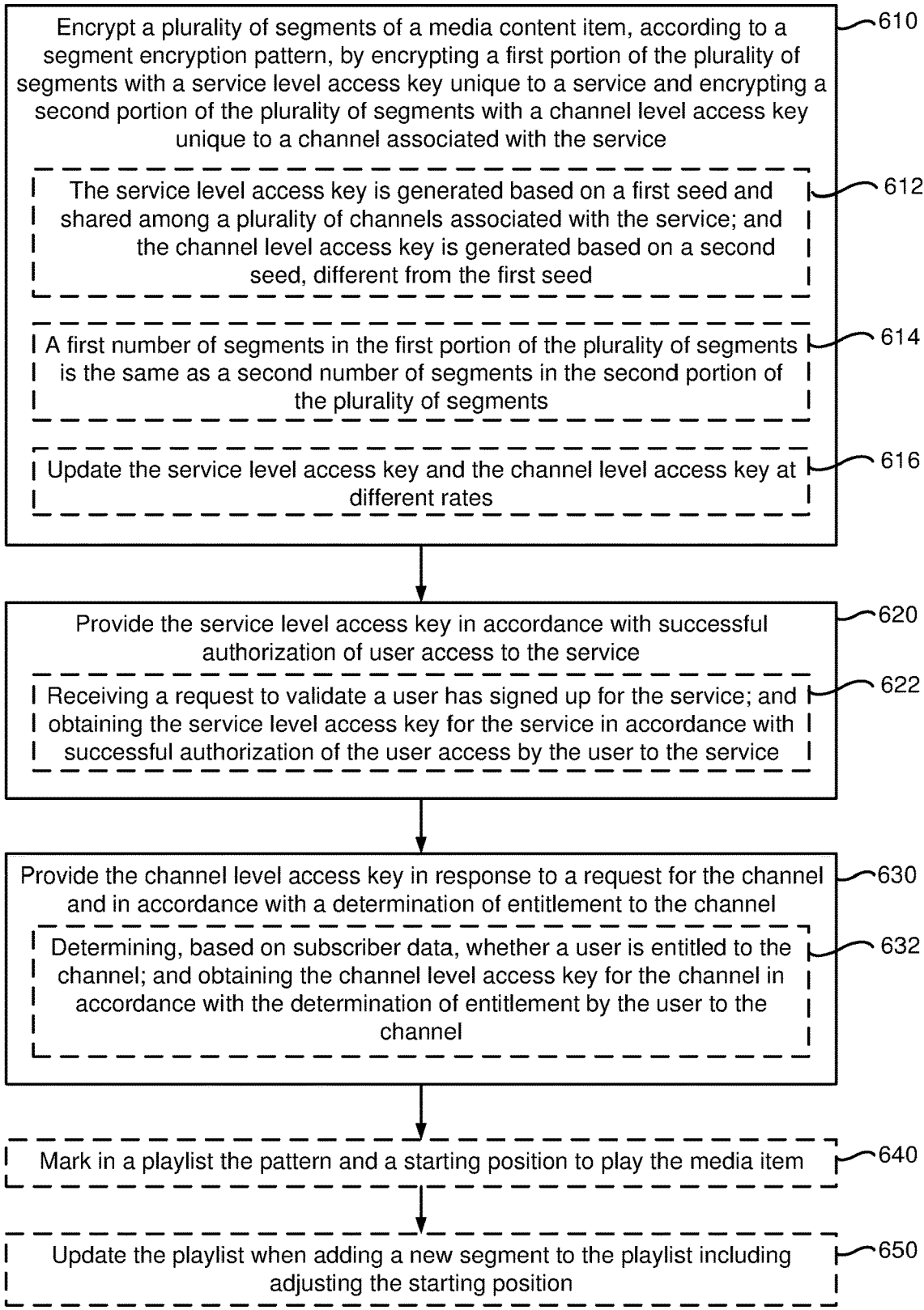
FIG. 6 is a flowchart illustrating a method of content preparation for secure fast channel change in accordance with some embodiments.

FIG. 6 is a flowchart representation of a method 600 for secure fast channel change performed on the server side, in accordance with some embodiments. In some embodiments, the method 600 is performed at a headend including a content server (e.g., the server 110, FIG. 1) and a license server (e.g., the license server 120, FIG. 2). In some embodiments, the content server includes at least one non-transitory storage for storing media content (e.g., the content storage 114, FIG. 1) and an encoder (e.g., the packager/encoder 112, FIG. 1) for packaging and encrypting media content items.

In some embodiments, the license server includes at least one non-transitory storage for storing subscriber data (e.g., the storage 122, FIG. 1) and two license generators (e.g., the service level access key generator 210 and the channel level access key generator 220, FIG. 2) for providing licenses. Briefly, the method 600 includes encrypting a plurality of segments of a media content item, according to a segment encryption pattern, by encrypting a first portion of the plurality of segments with a service level access key unique to a service and encrypting a second portion of the plurality of segments with a channel level access key unique to a channel associated with the service; providing the service level access key in accordance with successful authorization of user access to the service; and providing the channel level access key in response to a request for the channel and in accordance with a determination of entitlement to the channel.

To that end, as represented by block 610, the method 600 includes the encoder encrypting a plurality of segments of a media content item, according to a segment encryption pattern, by encrypting a first portion of the plurality of segments with a service level access key unique to a service and encrypting a second portion of the plurality of segments with a channel level access key unique to a channel associated with the service. In some embodiments, as represented by block 612, the service level access key is generated based on a first seed and shared among a plurality of channels associated with the service; and the channel level access key is generated based on a second seed that is different from the first seed.

For example, in FIG. 2, the service level access key generator 210 generates the service level access keys wrapped in the LSP based on the SP seed; and the channel level access key generator 220 generates the channel level access keys wrapped in the LCP based on the CP seed. As explained above with reference to FIG. 2, the SP seed is different from the CP seed in that the SP seed is unique to a service (or a logical partition of services provided by a service provider, such as sports, movies, etc.) that is shared among a plurality of channels (e.g., a group of sports channels, a group of movie channels, etc.).

Referring back to FIG. 6, in some embodiments, as represented by block 614, a first number of segments in the first portion of the plurality of segments is the same as a second number of segments in the second portion of the plurality of segments. For example, in FIG. 3, the encoder encrypts alternate segments with a key derived from each seed. Thus, a first portion, e.g., 1.ts is protected with the CP seed and a successive portion, e.g., 2.ts is protected with the SP seed. Accordingly, there are an equal number of segments in the first portion and the second portion. In another example, in FIG. 4A, the encoder encrypts two alternating segments with a key derived from each seed. Thus, a first portion with two segments (e.g., including 1.ts and 2.ts) is protected with the CP seed and a second portion with an equal number of segments as the first portion (e.g., including 3.ts and 4.ts) is protected with the SP seed.

In some embodiments, for enhanced security, as represented by block 616, the service level access key and the channel level access key are updated periodically but at different rates. For example, the service level access key generator 210 (FIG. 2) updates the service level access key at a first rate (e.g., rotating the SP seed daily), and the channel level access key generator 220 (FIG. 2) updates the channel level access key at a second rate (e.g., rotating the CP seed every four hours) that is different from the first rate.

Still referring to FIG. 6, as represented by block 620, the method 600 continues with the service level access key generator providing the service level access key in accordance with successful authorization of user access to the service. In some embodiments, as represented by block 622, the method 600 includes providing the service level access key in accordance with successful authorization of user access to the service receiving a request to validate a user has signed up for the service, and obtaining the service level access key for the service in accordance with successful authorization of the user access by the user to the service. For example, in FIG. 5, as soon as the login process in step 1 is successful, the client device 140 automatically requests the LSP in step 2. In response, the service level access key generator 210 provides the LSP in step 3.

The method 600 further continues, as presented by block 630, with the channel level access key generator providing the channel level access key in response to a request for the channel and in accordance with a determination of entitlement to the channel. In some embodiments, as represented by block 632, the method 600 includes providing the channel level access key in response to the request for the channel and in accordance with the determination of entitlement to the channel, the method 600 includes determining, based on subscriber data, whether a user is entitled to the channel, and obtaining the channel level access key for the channel in accordance with the determination of entitlement by the user to the channel. For example, as shown in FIG. 5, after a channel selection in step 5, the channel level access key generator 220 generates the channel level access key for the channel if the user is entitled to the channel (e.g., determined based on the subscriber data 122, FIG. 1).

In some embodiments, as represented by block 640, the method 600 further includes marking in a playlist the segment encryption pattern, including indicating whether a respective segment in the first portion or the second portion of the plurality of segments is encrypted with the service level access key or the channel level access key. The encoder further marks in the playlist a starting position to play the media item, where the starting position aligns with a first segment in the first portion of the plurality of segments. The encoder then provides the playlist to a client device requesting the media content item. For example, as shown in FIGS. 3 and 4A-4C, for HLS content, the encoder may include an EXT-X-START attribute to define a start position that coincides with a segment protected with the SP seed. Further as explained above in connection with FIG. 2, in some embodiments, the packager/encoder 112 also inserts encryption metadata, e.g., EXT-X-KEY, which will be used by the client device for locating the corresponding decryption keys for each segment. The encoder then sends the playlist that records which segments are protected via which seed to the client device 140 in step 4a.

In some embodiments, as represented by block 650, the method 600 further includes adding a new segment to the playlist, and adjusting the starting position to align with a second segment in the first portion of the plurality of segments. For example, as shown in FIG. 3, when a new segment is added to the presentation, the starting position is adjusted by a complete segment duration forwards or backwards, e.g., from starting at 4.ts to starting at 6.ts, so that the client device can play from a segment protected with the SP seed.

Figure 7:
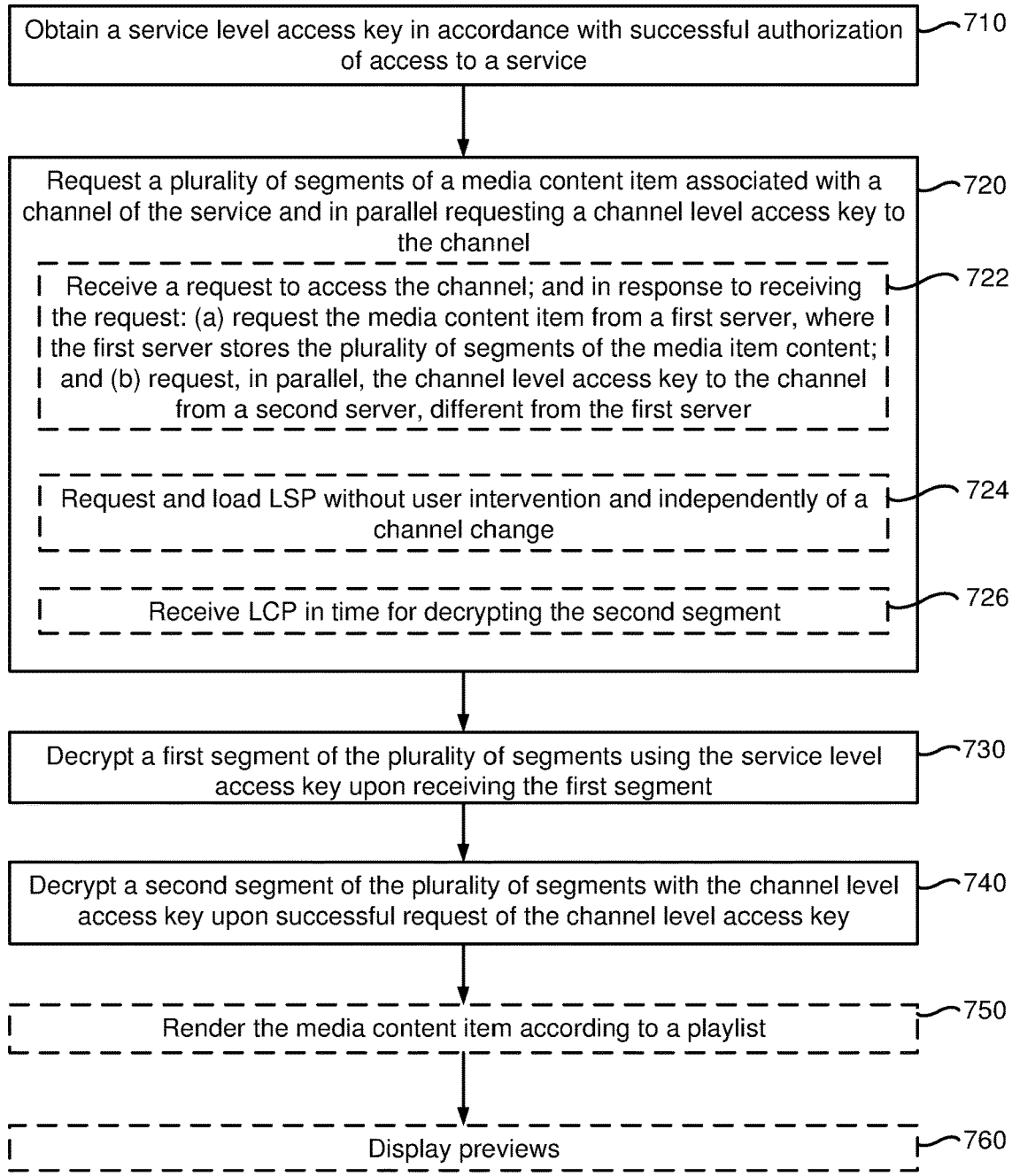
FIG. 7 is a flowchart illustrating a method of secure fast channel change on the client side in accordance with some embodiments.

FIG. 7 is a flowchart representation of a method 700 for secure fast channel change performed on the client side, in accordance with some embodiments. In some embodiments, the method 700 is performed at a client device (e.g., the client device 140, FIGS. 1, 2, and 5). In some embodiments, the client device includes an authenticator to authenticate a user and/or authorize access to a service (e.g., the authenticator 142, FIG. 1), a DRM controller to obtain decryption information (e.g., the DRM controller 144, FIG. 1) and to decrypt the encrypted media content items, and a renderer (e.g., the renderer 146, FIG. 1) for playing the decrypted media content items. In some embodiments, the client device also includes one or more non-transitory memory storage for storing identity and/or buffering media content items. Briefly, the method 700 includes, e.g., by the DRM controller 144, FIG. 1, obtaining a service level access key in accordance with successful authorization of access to a service; requesting a plurality of segments of a media content item associated with a channel of the service and in parallel requesting a channel level access key to the channel; decrypting a first segment of the plurality of segments using the service level access key upon receiving the first segment; and decrypting a second segment of the plurality of segments with the channel level access key upon successful request of the channel level access key.

To that end, as represented by block 710, the method 700 includes obtaining a service level access key in accordance with successful authorization of access to a service. As represented by block 720, the method 700 further includes requesting a plurality of segments of a media content item associated with a channel of the service and in parallel requesting a channel level access key to the channel. In some embodiments, as represented by block 722, the method 700 includes receiving a request to access the channel (e.g., selection of a channel to tune). In response to receiving the request, the DRM controller 144 (FIG. 1) requests the media content item from a first server (e.g., the server 110, FIG. 1), where the first server stores the plurality of segments of the media item content (e.g., in the content storage 114, FIG. 1), and in parallel, requests the channel level access key to the channel from a second server (e.g., the license server 120, FIG. 1) that is different from the first server. For example, in step 6b of FIG. 5, the client device 140 requests the media content items from the server 110 and in parallel requests the channel level access key from the channel level access key generator 220.

In some embodiments, as represented by block 724, the client device requests and loads the service level access key wrapped in the LSP without user intervention and independently of any channel change. As such, in some embodiments, obtaining the service level access key in accordance with successful authorization of access to the service includes determining whether or not a user has signed up for the service, e.g., the user logging in through an application associated with the service on the client device in step 1 of FIG. 5 and/or the authenticator 142 (FIG. 1) validates the identity of the user. In accordance with a determination that the user has signed up for the service, the DRM controller 144 (FIG. 1) requests, without user intervention, the service level access key from the second server (e.g., the license server 120). Further, the DRM controller 144 (FIG. 1) loads the service level access key independently of a channel change. In other words, even without selecting any channel (e.g., out-of-band), the client device proactively fetches the service level access key for improved efficiency.

In some embodiments, as represented by block 726, the client device receives the channel level access key from the second server prior to decrypting the second segment of the plurality of segments so that the channel level access key wrapped in the LCP is received in time for decrypting the second segment of the media content item. For example, in FIG. 5, while the client device 140 is decrypting and rendering the first segment with the LSP in step 6a, the client device 140 can fetch and load the channel level access key in parallel in step 6b before the end of playing the first segment and/or the beginning of playing the second segment. As such, providing the segment duration is sufficiently large enough (e.g., 2 seconds) to acquire the license and load the key, no delay will be incurred by fetching the channel license.

Referring back to FIG. 7, the method 700 continues, with the DRM controller 144 (FIG. 1) decrypting a first segment of the plurality of segments using the service level access key upon receiving the first segment (as represented by block 730) and decrypting a second segment of the plurality of segments with the channel level access key upon successful request of the channel level access key (as represented by block 740).

In some embodiments, as represented by block 750, the method 700 further includes rendering (e.g., with the renderer 146, FIG. 1) the media content item according to a playlist. In some embodiments, the client device further receives a playlist indicating a starting position to play the media content item, where the starting position coincides with the first segment protected with the service level access key. In accordance with the playlist, the renderer (e.g., the renderer 146, FIG. 1) of the client device renders the media content item starting with the first segment in accordance with the playlist. For example, in FIG. 2, the client device 140 receives a playlist and/or metadata from the packager/encoder 112 in step 4a. Further as shown in FIG. 3, for HLS content, in some embodiments, the EXT-X-START attribute in the playlist and/or metadata received by the client device defines a start position that coincides with a segment protected with the SP seed, e.g., 4.ts. The client device can then use the LSP to decode the segment and render the segment.

In some embodiments, as represented by block 760, the method 700 further includes displaying (e.g., with the renderer 146, FIG. 1) previews of channels. In some embodiments, the client device displays previews of channels associated with the service. The client device further receives an input selecting a preview of the previews. In response to receiving the input, the client device displays a segment of the preview, including decoding the segment of the preview with the service level access key.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a headend including one or more servers and each includes a non-transitory memory:
receiving a request for a manifest corresponding to a channel from a client device;
providing a manifest listing a plurality of segments for the channel in response to receiving the request, wherein the manifest indicates an alternating encryption pattern of repeatedly encrypting a first set of segments using a service level access key unique to a service associated with a plurality of channels and encrypting a second set of segments using a channel level access key unique to the channel;
receiving parallel requests from the client device requesting the channel level access key referenced in the manifest and the plurality of segments listed in the manifest; and
sending the channel level access key and the plurality of segments to the client device in accordance with determining entitlement to the channel at the client device.

2. The method of claim 1, further comprising:
generating the service level access key based on a first seed, wherein the first seed is shared among the plurality of channels associated with the service; and
generating the channel level access key based on a second seed, different from the first seed.

3. The method of claim 1, further comprising:
updating the service level access key at a first rate; and
updating the channel level access key at a second rate, different from the first rate.

4. The method of claim 1, further comprising:
sending, prior to receiving the parallel requests, the service level access key for the service to the client device in accordance with successful authorization of a user at the client device to the service.

5. The method of claim 1, further comprising:
determining, based on subscriber data, whether a user at the client device is entitled to the channel; and
obtaining the channel level access key for the channel in accordance with a determination of entitlement by the user to the channel.

6. The method of claim 1, wherein:
a segment among the plurality of segments that coincides with a starting position defined in the manifest is the protected with the service level access key.

7. The method of claim 1, further comprising:
adding a new segment to the plurality of segments; and
adjusting a starting position defined in the manifest to align with a segment in the plurality of segments protected with the service level access key.

8. A server comprising:
one or more processors; and
a non-transitory memory comprising instructions that, when executed, cause the one or more processors to perform operations comprising:
receiving a request for a manifest corresponding to a channel from a client device;
providing a manifest listing a plurality of segments for the channel in response to receiving the request, wherein the manifest indicates an alternating encryption pattern of repeatedly encrypting a first set of segments using a service level access key unique to a service associated with a plurality of channels and encrypting a second set of segments using a channel level access key unique to the channel;
receiving parallel requests from the client device requesting the channel level access key referenced in the manifest and the plurality of segments listed in the manifest; and
sending the channel level access key and the plurality of segments to the client device in accordance with determining entitlement to the channel at the client device.

9. The server of claim 8, wherein the operations further comprise:
generating the service level access key based on a first seed, wherein the first seed is shared among the plurality of channels associated with the service; and
generating the channel level access key based on a second seed, different from the first seed.

10. The server of claim 8, wherein the operations further comprise:
updating the service level access key at a first rate; and
updating the channel level access key at a second rate, different from the first rate.

11. The server of claim 8, wherein the operations further comprise:
sending, prior to receiving the parallel requests, the service level access key for the service to the client device in accordance with successful authorization of a user at the client device to the service.

12. The server of claim 8, wherein the operations further comprise:
determining, based on subscriber data, whether a user at the client device is entitled to the channel; and
obtaining the channel level access key for the channel in accordance with a determination of entitlement by the user to the channel.

13. The server of claim 8, wherein:
a segment among the plurality of segments that coincides with a starting position defined in the manifest is the protected with the service level access key.

14. The server of claim 8, wherein the operations further comprise:
adding a new segment to the plurality of segments; and
adjusting a starting position defined in the manifest to align with a segment in the plurality of segments protected with the service level access key.

15. A non-transitory memory storing one or more programs, which, when executed by one or more servers, cause the one or more servers to:
receive a request for a manifest corresponding to a channel from a client device;
provide a manifest listing a plurality of segments for the channel in response to receiving the request, wherein the manifest indicates an alternating encryption pattern of repeatedly encrypting a first set of segments using a service level access key unique to a service associated with a plurality of channels and encrypting a second set of segments using a channel level access key unique to the channel;
receive parallel requests from the client device requesting the channel level access key referenced in the manifest and the plurality of segments listed in the manifest; and
send the channel level access key and the plurality of segments to the client device in accordance with determining entitlement to the channel at the client device.

16. The non-transitory memory of claim 15, wherein the one or more programs, which, when executed by the one or more servers, further cause the one or more servers to:
generate the service level access key based on a first seed, wherein the first seed is shared among the plurality of channels associated with the service; and
generate the channel level access key based on a second seed, different from the first seed.

17. The non-transitory memory of claim 15, wherein the one or more programs, which, when executed by the one or more servers, further cause the one or more servers to:
update the service level access key at a first rate; and
update the channel level access key at a second rate, different from the first rate.

18. The non-transitory memory of claim 15, wherein the one or more programs, which, when executed by the one or more servers, further cause the one or more servers to:
send, prior to receiving the parallel requests, the service level access key for the service to the client device in accordance with successful authorization of a user at the client device to the service.

19. The non-transitory memory of claim 15, wherein the one or more programs, which, when executed by the one or more servers, further cause the one or more servers to:
determine, based on subscriber data, whether a user at the client device is entitled to the channel; and
obtain the channel level access key for the channel in accordance with a determination of entitlement by the user to the channel.

20. The non-transitory memory of claim 15, wherein:
a segment among the plurality of segments that coincides with a starting position defined in the manifest is the protected with the service level access key.

\* \* \* \* \*